United States Patent
Teruhi et al.

(10) Patent No.: US 7,327,676 B2
(45) Date of Patent: Feb. 5, 2008

(54) DATA TRANSMISSION CONTROL METHOD, PROGRAM THEREFOR AND DATA TRANSMISSION UNIT USING THE SAME

(75) Inventors: Shigeru Teruhi, Higashiyamato (JP); Yoshihiko Uematsu, Tokyo (JP); Hidetoshi Mori, Chiba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1188 days.

(21) Appl. No.: 10/267,750

(22) Filed: Oct. 10, 2002

(65) Prior Publication Data

US 2003/0072269 A1    Apr. 17, 2003

(30) Foreign Application Priority Data

Oct. 11, 2001 (JP) .............................. 2001-313490
Apr. 23, 2002 (JP) .............................. 2002-120058

(51) Int. Cl.
H04L 12/26 (2006.01)
H04J 3/16 (2006.01)
G06F 15/16 (2006.01)

(52) U.S. Cl. ................... 370/230; 370/235; 370/468; 709/232

(58) Field of Classification Search ........... 370/252, 370/237, 395, 394, 397, 229, 238, 468, 230; 709/235, 239; 379/221.01
See application file for complete search history.

(56) References Cited

U.S. PATENT DOCUMENTS

| | | | | |
|---|---|---|---|---|
| 5,790,543 A | * | 8/1998 | Cloutier ...................... | 370/252 |
| 6,094,418 A | * | 7/2000 | Soumiya et al. ............ | 370/231 |
| 6,259,677 B1 | * | 7/2001 | Jain ............................ | 370/252 |
| 6,272,111 B1 | * | 8/2001 | Murase ....................... | 370/237 |
| 6,314,105 B1 | * | 11/2001 | Luong ..................... | 370/395.2 |
| 2001/0004352 A1 | * | 6/2001 | Watanabe et al. ........... | 370/252 |
| 2001/0050903 A1 | * | 12/2001 | Vanlint ........................ | 370/252 |

FOREIGN PATENT DOCUMENTS

| | | |
|---|---|---|
| JP | 2-137538 | 5/1990 |
| JP | 10-257071 | 9/1998 |
| JP | 11-163916 | 6/1999 |
| JP | 2000-174770 | 6/2000 |
| JP | 2000-216815 | 8/2000 |
| JP | 2000-216817 | 8/2000 |
| JP | 2000-358030 | 12/2000 |

OTHER PUBLICATIONS

Shigeru Teruhi, et al., "A Scheme for Robust Internet Streaming Based on Congestion-aware Network Load Balancing", The 2002 Society Conference of IEICE, Sep. 10-13, 2002, pp. 13-14.

* cited by examiner

Primary Examiner—Chi Pham
Assistant Examiner—Tri H. Phan
(74) Attorney, Agent, or Firm—Oblon, Spivak, McClelland, Maier & Neustadt, P.C.

(57) ABSTRACT

A source node 11 obtains from a destination node 12 quality information on routes 31 and 32 to the node 12, and adaptively changes data distribution ratios for the multiple routes based on the quality information.

21 Claims, 16 Drawing Sheets

FIG. 5

RTCP-SR 80

| V | RC | PT | LENGTH |
|---|----|----|--------|
| SSRC OF SENDER ||||
| NTP TIMESTAMP ||||
| RTP TIMESTAMP ||||
| SENDER'S PACKET COUNT ||||
| FRACTION LOST || CUMULATIVE NUMBER OF PACKETS LOST | NPL |
| INTER-ARRIVAL JITTER ||||
| LAST SR (LSR) ||||
| DELAY SINCE LAST SR (DLSR) ||||

IP HEADER 4H

| V | IHL | TOS | LENGTH |
|---|-----|-----|--------|
| ID ||| FRAGMENT |
| TTL | PROTOCOL || CHECKSUM |
| SOURCE ADDRESS ||||
| DESTINATION ADDRESS ||||
| OPTION & PADDING ||||
| PAYLOAD ||||

– 41
– 42
– 43
– 44
– 45
– 46

DATA TRANSMISSION CONTROL METHOD, PROGRAM THEREFOR AND DATA TRANSMISSION UNIT USING THE SAME

BACKGROUND OF THE INVENTION

The present invention relates to a data transmission control method suitable for use to avoid network load concentration, transmission delay fluctuations due to congestion and packet loss in a network which provides a best-effort service like the Internet. The invention also pertains to a program for implementing the method and a data transmission unit using the method.

Since the routing algorithm of the Internet usually chooses the shortest route between nodes, Internet communications are conventionally carried out using only the shortest route.

On the other hand, attempts have been made to adapt the Internet to multi-path routing. There is known in the art a router equipped with functions that, for example, in the case of using an OSPF (Open Shortest Path First) scheme as the routing algorithm, supports decentralization of equivalent traffic loads among multiple routes of equal metrics, and that, in the case of using an IGRP (Interior Gateway Routing Protocol) scheme, unequally distributes the network traffic to multiple routes of unequal metrics in proportion to their metrics.

In the Internet now in use that carries out communications over only one route, network fault and traffic congestion are unavoidable, and when data loss or sever delay are caused by such network fault and traffic congestion, congestion control suppresses the traffic load to the failed route, giving rise to a problem that the throughput cannot be obtained as desired.

A conventional data distribution system in which a router determines distribution ratios for multiple routes based on their metric values does not reflect the ever-changing route conditions in the metric values, and hence this system is not the best distribution system taking into account the condition of each route. This system causes a problem that the throughput on all routes decreases under the influence of some routes of deteriorated conditions.

EdgeStream, Inc. proposes a delivery system in which plural delivery servers capable of sending the same contents in synchronization with each other are provided on different routes of a network, and when the traffic load on the contents transmitting route from the one delivery server to a user exceeds a prescribed value, the contents are sent via the other delivery server, thereby providing a guarantee of moving picture quality at a predetermined transmission rate. This method calls for plural servers, and hence raises the cost accordingly. In addition, this method is not free from the possibility that route switching interrupts the image being played back.

In Japanese Patent Application Laid-Open Gazette No. 2000-216817 there is described a system in which each router on the network monitors the traffic state on the transmission line and, when traffic concentration exceeding the premeasured throughput of a route, switches the route to another as a detour. However, this method requires premeasuring the throughput of each route and generating a routing table of every router on the network on the basis of the premeasured throughputs; hence, this method is impractical.

SUMMARY OF THE INVENTION

It is therefore an object of the present invention to provide a data transmission control method suitable for use to avoid network load concentration, transmission delay fluctuations due to traffic congestion and packet loss in a network which provides a best-effort service like the Internet, and a program for implementing the method and a data transmission unit using the method.

The data transmission control method according to the present invention which is used at the source node on the network to send therefrom data to the destination node, the method comprising:

(a) obtaining from the destination node quality information on multiple routes between the source and the destination node; and (b) adaptively changing data distribution ratios for the multiple routes based on the route quality information.

According to the present invention, the transmission unit, which sets up multiple communication routes from the source node to the destination node on the network and distributes and sends data, comprises: means for obtaining quality information on the multiple routes from the destination node; and distribution control means for adaptively changing data distribution ratios for the multiple routes on the basis of their quality information obtained by the quality information obtaining means.

BRIEF DESCRIPTION OF THE DRAWINGS

FIG. 5 is a diagram showing the configuration of the packet configuration of a sender report RTCP-SR;

FIG. 6 is a diagram showing the configuration of an IP packet;

DETAILED DESCRIPTION OF THE PREFERRED EMBODIMENTS

A detailed description will be given, with reference to the accompanying drawings, of preferred embodiments of the present invention. To facilitate a better understanding, the present invention will be described as being applied to a real-time data transfer through utilization of an RTP/RTCP (Real-Time Transport Protocol/Real-Time Transport Control Protocol) scheme equipped with a function of monitoring the network quality, but the present invention I not limited specifically thereto. Other various data delivery schemes provided with network quality monitoring means also fall inside the scope of the present invention.

Basic Principle of the Invention

Figure 1:
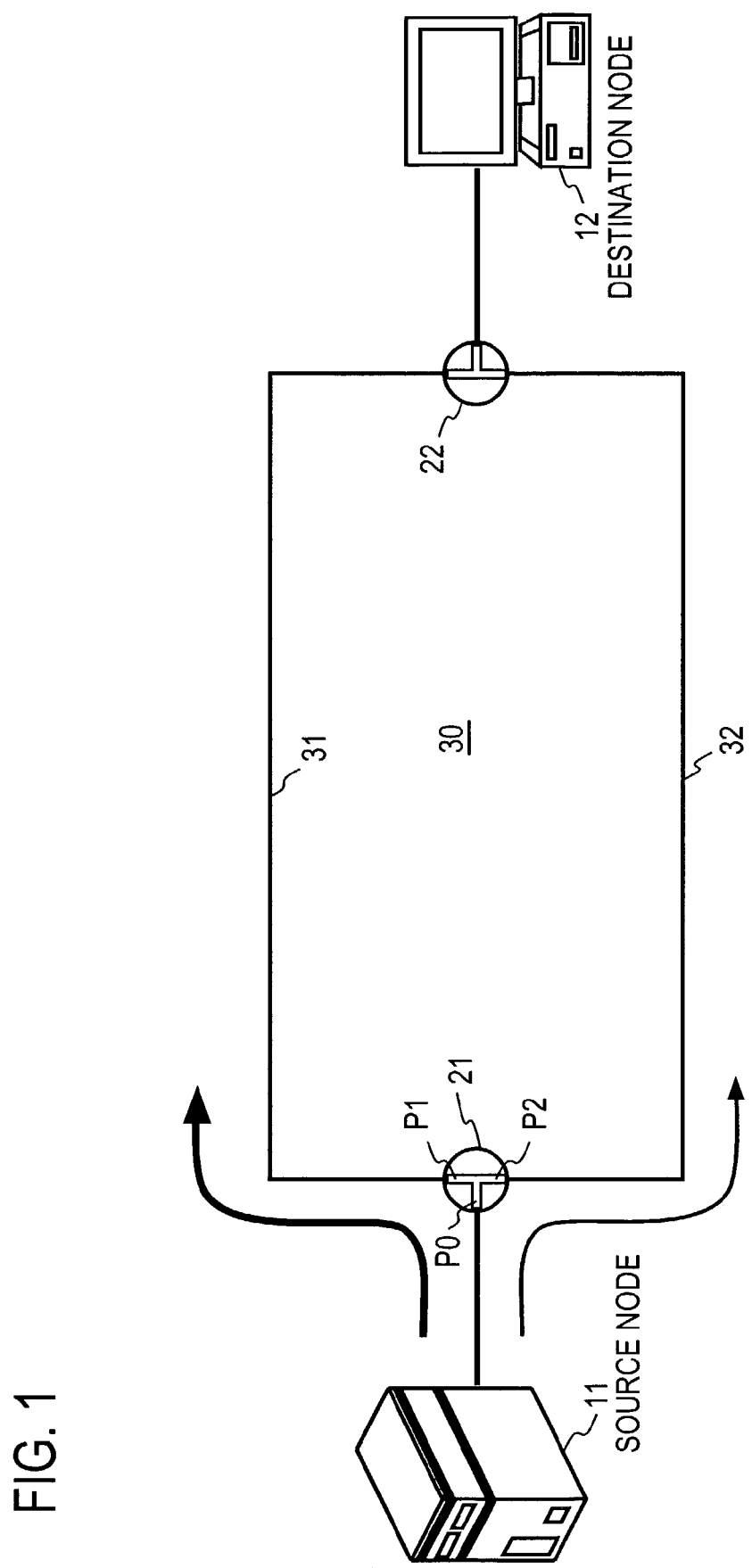
FIG. 1 is a diagrammatic showing of the network architecture embodying the present invention.
Figure 2:
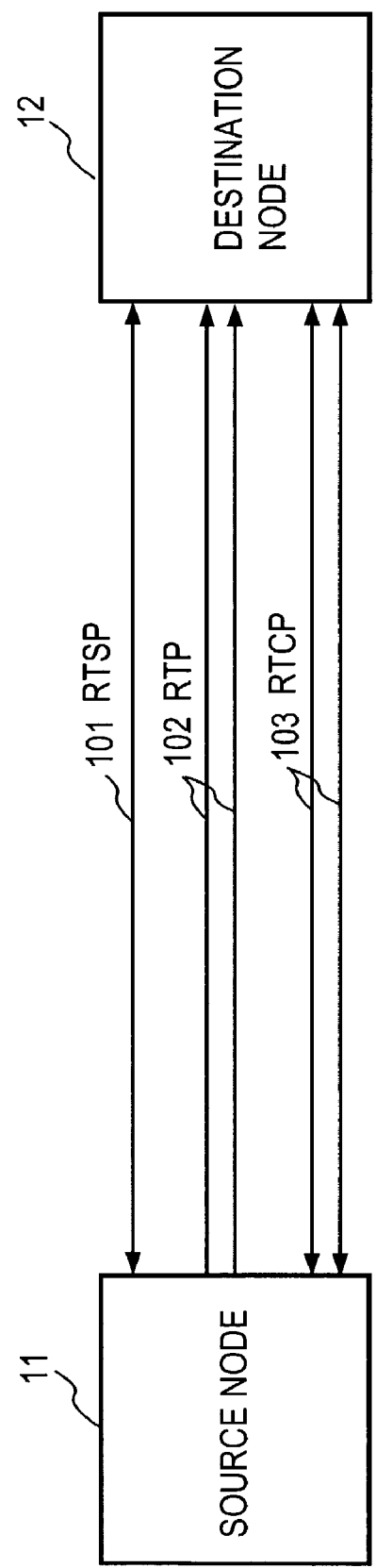
FIG. 2 is a diagram schematically showing the connection between the source node and the destination node in FIG. 1.

FIG. 1 is a block diagram illustrating a basic network configuration which embodies the data transmission control method according to the present invention. FIG. 2 is a diagram showing connections of a multimedia data delivery system using the RTP/RTCP scheme between source and destination nodes in the network architecture of FIG. 1. RTP is a protocol developed for supporting packet delivery of video and audio data, and possesses a function of framing in a real-time application.

As shown in FIG. 1, the network architecture embodying the present invention has an existing network 30, and nodes 11 and 12 connected thereto via edge routers 21 and 22. According to the present invention, for example, a data packet from the source node 11 is distributed by the edge router 21 to one or more routes 31 and 32, for instance, over which it is sent to the destination node 12 via the edge router 22. While this example is shown to use only two routes 31 and 32, more than two routes may sometimes be used, and accordingly, the edge routers 21 and 22 (which need not always be edge routers) each have ports P0, P1 and P2 larger in number than the routes used.

According to the basic principle of the data transmission control method of the present invention, the source node 11 sends a packet to the destination node 12 over one route or more routes 31 and 32 to which the packet is distributed by use of a transport protocol. The destination node 12 obtains one or more of, for example, the packet loss ratio, the packet inter-arrival jitter, the one-way trip time and so on from the received packet, then writes them as information indicating the route quality (route quality information) in a receiver report, and sends the receiver report to the source. The source adaptively determines the distribution ratios for the multiple routes by changing the packet distribution ratios based on the route quality information in the received receiver report each time the source receives the report.

As shown in FIG. 2, in a data delivery system using RTP as a transport protocol, connections are established between the source and destination nodes 11 and 12 via a TCP (Transport Control Protocol) channel 101 of RTSP (Real-Time Streaming Protocol) and a UDP (User Datagram Protocol) channel 102 of RTP. A control channel 103 by RTCP is used to control RTP data transmission, and it possesses a function of offering information on the quality of data delivery to an application as mentioned above.

To measure the quality of each route, an RTP/RTCP session is provided on each route as described later on, then unified sequence numbers are assigned to all packets to be sent over multiple routes in a high-order application, and at the destination node the packets received from the same source over the multiple routes are rearranged in order of the sequence numbers.

Figure 3:
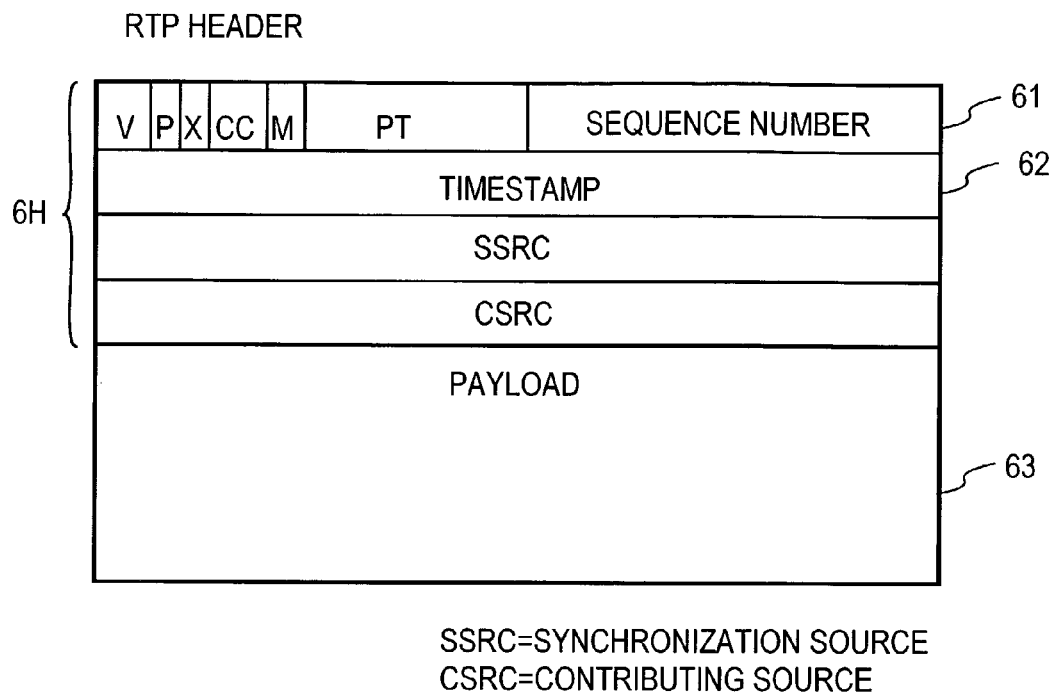
FIG. 3 is a diagram showing the configuration of an RTP header.
Figure 4:
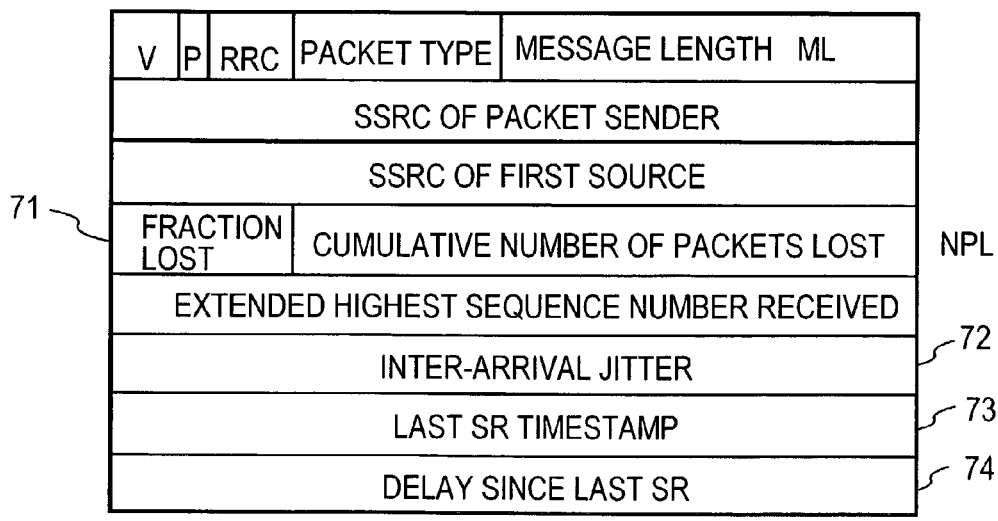
FIG. 4 is a diagram showing the configuration of the packet configuration of a receiver report RTCP-RR.

FIGS. 3 and 4 show the format of an RTP header 6H of the IETF (Internet Engineering Task Force) spec and the format of a packet 70 of a receiver report using RTCP (which report will hereinafter be identified as RTCP-RR). As depicted in FIG. 3, the RT header 6H has version information V, padding P, extension bit X, number of sources concerned CC, marker bit M, payload type PT, sequence number SN, timestamp TS, synchronization source identifier SSRC and contributing source identifier SSRC, and is added with a payload 63. It is the sequence number (SN) 61 of the packet, the timestamp (TS) 62 indicating the packet-sending time, the synchronization source identifier SSRC and the payload (PL) 63 storing data that are related directly to the data transmission control method according to the present invention.

As shown in FIG. 4, the receiver report (RTCP-RR) 70 has version information V, padding P, receiver report count RRC, packet type PT, message length ML, synchronization source identifier of packet sender SSRC, synchronization source identifier of sender 1, packet loss ratio 71, cumulative number of packets lost (NPL), inter-arrival jitter (J) 72, last sender report timestamp LSR and delay since last sender report DLSR. Of them, the synchronization source identifier of packet sender SSRC, the packet loss ratio 71, the inter-arrival jitter 72, last sender report timestamp 73 and the delay since last sender report DLSR 74 are related directly to the data transmission control method according to the present invention.

At the destination node 12 it is possible to compute the packet loss ratio and jitter during one-way transmission from the source node 11 to the destination node 12 (which jitter will hereinafter be referred to simply as jitter J) on the basis of the sequence number 61 and the timestamp 62 in the received RTP packet 60. On the other hand, at the source node 11 it is possible to obtain the packet loss ratio 71 and the jitter 72 during one-way transmission from the receiver report RTCP-RR. Further, it is possible to compute the RTCP packet round-trip time RTT from the sending timestamp of an RTCP sender report (hereinafter identified as RTCP-SR) from the source node to the destination node, the receiver report RTCP-RR receiving timestamp and the last sender report timestamp LSR and the delay since the last sender report DLSR carried in RTCP-RR.

FIG. 5 depicts the configuration of an RTCP sender report (RTCP-SR) 80. The illustrates report configuration differs from the receiver report RTCP-RR in that an NTP timestamp 81, an RTP timestamp 82 and the cumulative number of sender packets 83 are added as sender information.

FIG. 6 depicts the configuration of an IP header 4H. The IP header 4H contains, version information V, header length IHL (Internet Header Length), TOS (Type of Service) 41, IP packet length (LEN) 42, datagram identifier ID 43, fragment control field FRAGMENT 44, sender address SOURCE ADDRESS 45 and destination address DESTINATION ADDRESS 46.

Figure 7:
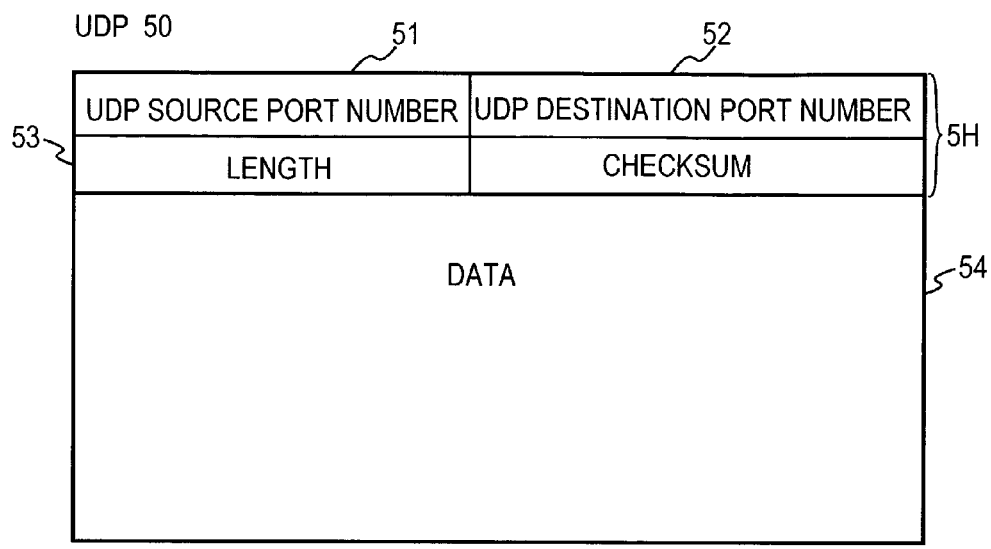
FIG. 7 is a diagram showing the configuration of a UDP protocol.

FIG. 7 shows the configuration of a UDP (User Datagram Protocol) 50. UDP comprises a header 5H containing source port number 51, UDP destination port number 52 and LENGTH 53 representative of the number of bytes of all UDP datagrams, and data 54.

Figure 8A:
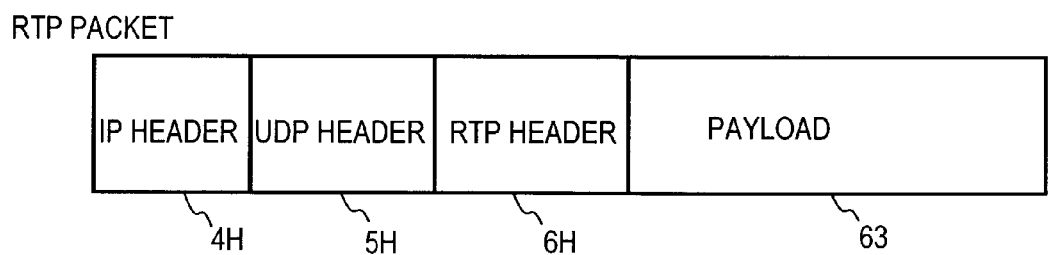
FIG. 8A is a diagram showing the configuration of an RTP packet.
Figure 8B:
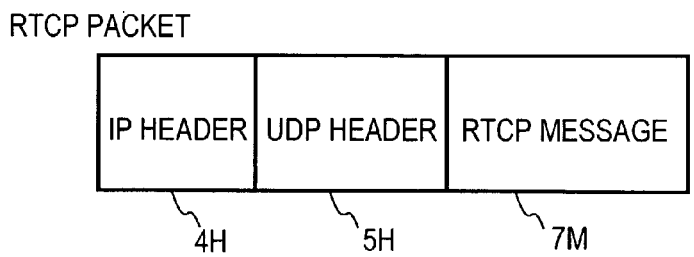
FIG. 8B is a diagram showing the configuration of an RTCP packet.

As depicted in FIG. 8A, the RTP packet is made up of IP header 4H, UDP header 5H, RTP header 6H and RTP data (payload) 63. The RTCP packet comprises, as shown in FIG. 8B, IP header, UDP header 5H and RTCP message 7M. The IP header 4H has a TOS field as shown in FIG. 6, whereas the UDP header has a destination port number field as shown in FIG. 7.

As the edge routers 21 and 22 on the network 30 shown in FIG. 1, there are generally available routers equipped with a policy routing function that presets a policy as to how to perform packet routing and carry it out accordingly. With such a router, the output port for an input packet, for example, from a port 0 connected to the node can be determined according to the value of TOS 41 (hereinafter referred to as a TOS value) of the IP header; and the output port for an input packet from the other ports can be determined according to the destination address 46 of the IP header. Accordingly, the TOS values of the IP headers 4H of respective packets can be sequentially determined by the application at the source node 11 so that packets are distributed among the plural ports P1 and P2 at desired distribution ratios.

Alternatively, it is possible to specify port numbers by the UDP destination port number 52 in FIG. 7 according to the application used so that the router 21 outputs packets to the specified ports according to the individual destination port numbers 52. In a conventional end-to-end connection, the application fixes the TOS value at a certain value and the router selects the packet output port corresponding to the destination address 46 in the IP header 4H from a routing table.

Figure 9:
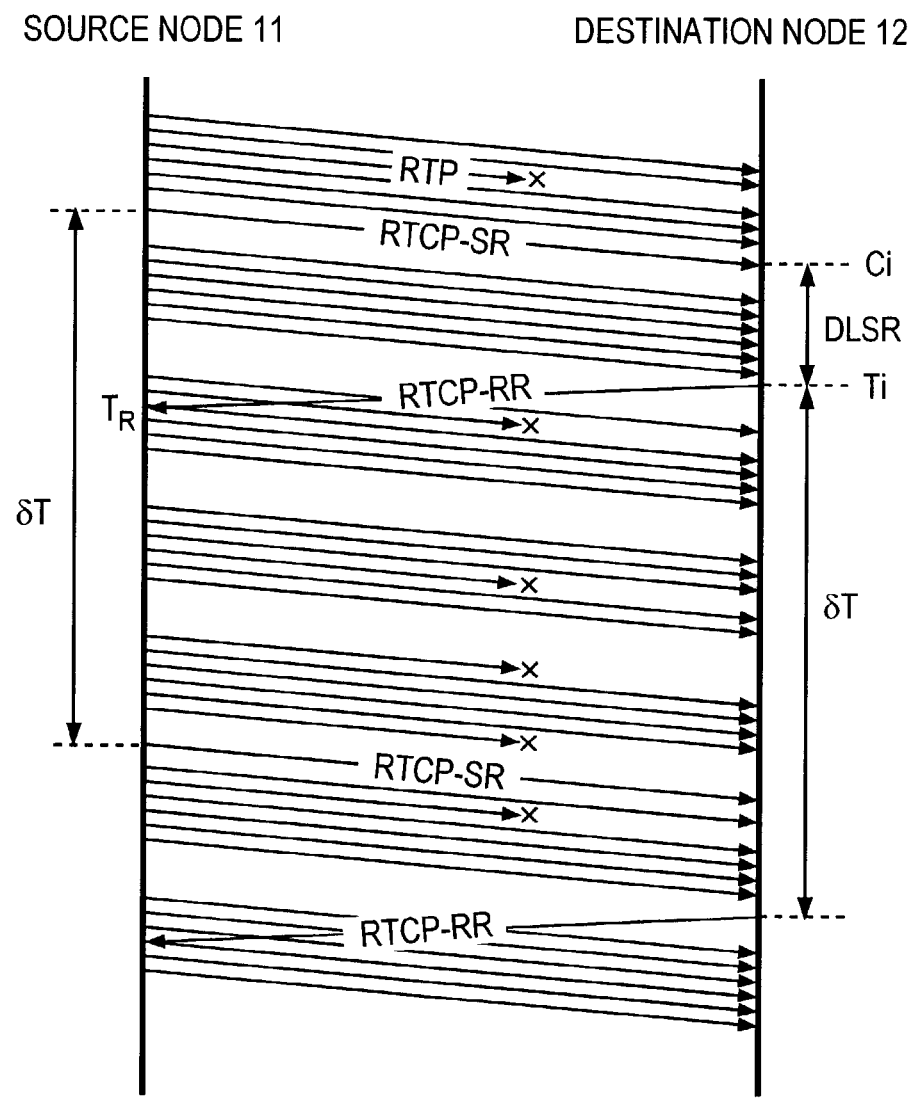
FIG. 9 is a diagram depicting the sequence of communication between the source and the destination node.

FIG. 9 shows an example of a packet transfer sequence between the source node 11 and the destination node 12. The source node 11 sends packet data over one or more routes by RTP, and sends the sender report RTCP-SR at fixed time intervals δT (for example, several seconds). The arrows shown between the source node 11 and the destination node 12 represent packets, and the symbol x represents packets lost on the routes. The destination arranges the packets received from the source over the respective routes in the order of the packet sequence number 61 (FIG. 3) in the RTP header, checks which numbers are missing, and calculates the packet loss ratio.

The destination node 12 sends RTCP-RR to the source node 11 at the same time intervals δT as is the case with the source node 11 (need not always be the same). AT this time, the destination node 12 writes, as route quality information, the packet loss ratio, the RTP packet inter-arrival jitter J, the timestamp 81 for the immediately previously received RTCP-SR (FIG. 5) and the delay DLSR (Delay since Last) since the last sender report RTC-SR in fields 71 to 74 of RTCP-RR (FIG. 4), thereafter sending the receiver report. DLSR is computed, as depicted in FIG. 9, by DLSR=Ti−Ci where Ci is the receiving time for the last sender report RTCP-ST and Ti is the time of generation of the receiver report RTCP-RR.

The RTP packet inter-arrival jitter J is defined, for example, by the following equations from receiving times $R_{n-1}$ and $R_n$ for (n−1)-th and n-th RTP packets in the order of packet sequence.

$$D(n, n-1)=(R_n-TS_n)-(R_{n-1}-TS_{n-1}) \quad (1)$$

$$J=J+\{|D(n, n-1)|-J\}/16 \quad (2)$$

The source node 11 extracts the route quality information from RTCP-RR received from the destination node 12 and, based on the packet inter-arrival jitter J, determines RTP packet distribution ratios for the respective routes. Alternatively, the source node 11 computes RTCP round-trip time RTT by the following equation from the receiving time $T_R$ of the receiver report RTCP-RR responding to the sender report RTCP-SR $$RTT=T_R-DLSR-LSR \quad (3)$$

and the source node may use the RTCP round-tip time RTT as route quality information.

Since the source node is able to know the traffic conditions (quality) of routes as described above, it can adaptively increase or decrease the packet data distribution ratios for the respective routes, taking into account their conditions. This embodiment features measuring the quality of routes for data delivery at whatever time and determining the packet distribution ratios for the respective routes based on the quality information.

Figure 10:
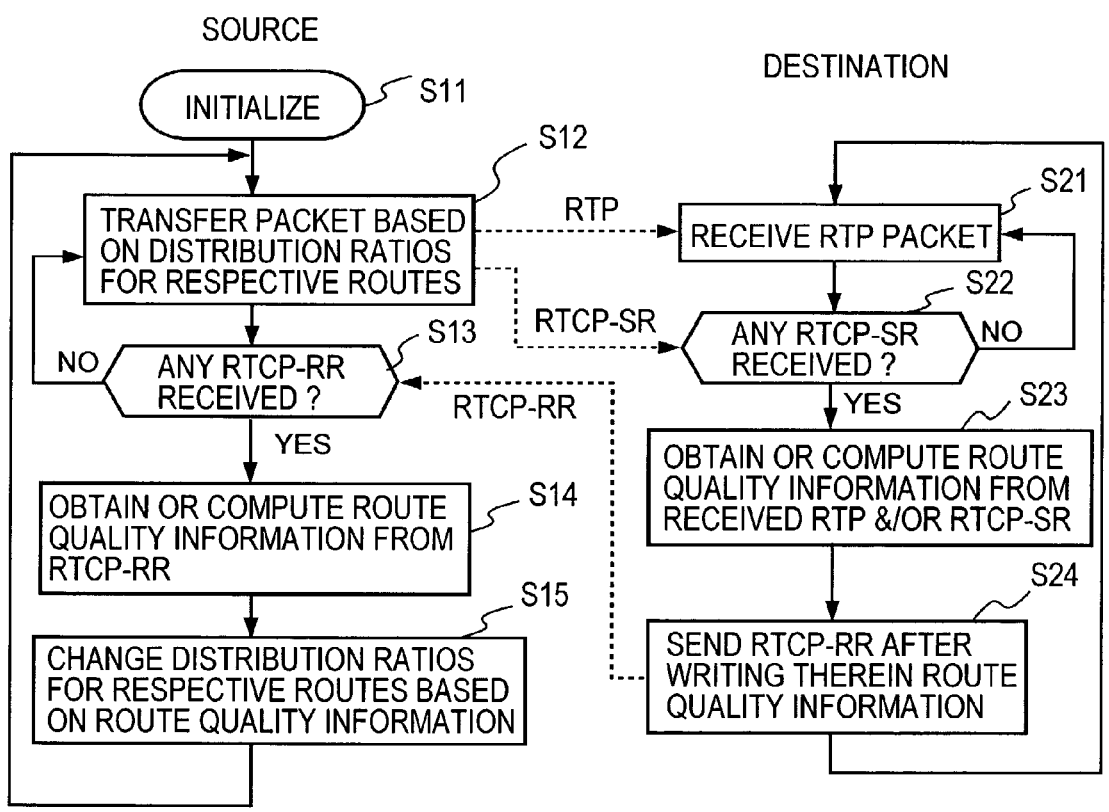
FIG. 10 is a flowchart depicting the basic procedure of the transmission control method according to the present invention.

FIG. 10 illustrates the procedures of the source node and the destination node based on the basic principle of the data transmission control method according to the present invention.

At the source node:

Step S11: Determine initial values of distribution ratios for multiple routes as desired.

Step S12: Transfer RTP packets over respective routes at the determined distribution ratios and send the sender report RTCP-SR at fixed time intervals.

Step S13: Make a check at fixed time intervals to see if any receiver report RTCP-RR has been received, and if not, return to step S121.

Step S14: If receiver report has been received, obtain or compute route quality information from the received receiver report RTCP-RR.

Step S15: Update the distribution ratios for the multiple routes in accordance with the obtained quality information, then returns to step S12, and transfer RTP packets over the multiple routes at the updated distribution ratios.

At the destination node:

Step S21: Receive RTP packets.

Step S22: Make a check to see if any sender report RTCP-SR has been received from the source node, and if not, returns to step S21.

Step S23: Compute or obtain route quality information from the received RTP packets and/or the sender report RTCP-SR.

Step S24: Write the route quality information in the receiver report RTCP-RR and send the report to the source node and return to step S21.

As the route quality information, it is possible to use any one or more of the packet loss rate on each route for data delivery, the round-trip time and jitter as mentioned previously, and the data distribution ratios for the multiple routes are changed based on the route quality information.

Embodiment 1

In this embodiment, the destination node obtains the quality information on respective routes from the RTP packets and RTCP-SR received via the respective routes and sends the quality information to the source node, which, in turn, changes the distribution ratios for the respective routes on the basis of the quality information on the routes. Since the route from which each received RTP packet was output can be detected from the TOS value of the IP header 4H (FIG. 6) or the destination port number 52 of the UDP header 5H (FIG. 7), it is possible to calculate the packet loss rate and the packet inter-arrival jitter for each route.

For example, in a route with a large packet loss ratio, there is the possibility of a persistent congestion occurring; hence, the data distribution ratio for this route is sharply decreased, but instead the distribution ratios for routes of low packet loss rate are increased.

In the case of adaptively changing the distribution ratios by the source node, for example, upon each reception of RTCP-RR, the source node repeats, in step S14 in FIG. 10, the operations of: comparing quality values of the respective routes, decreasing the distribution ratio for a route of the minimum quality value by a predetermined value, while at the same time increasing the distribution ratio for a route of the maximum quality value by a predetermined value.

Figure 11:
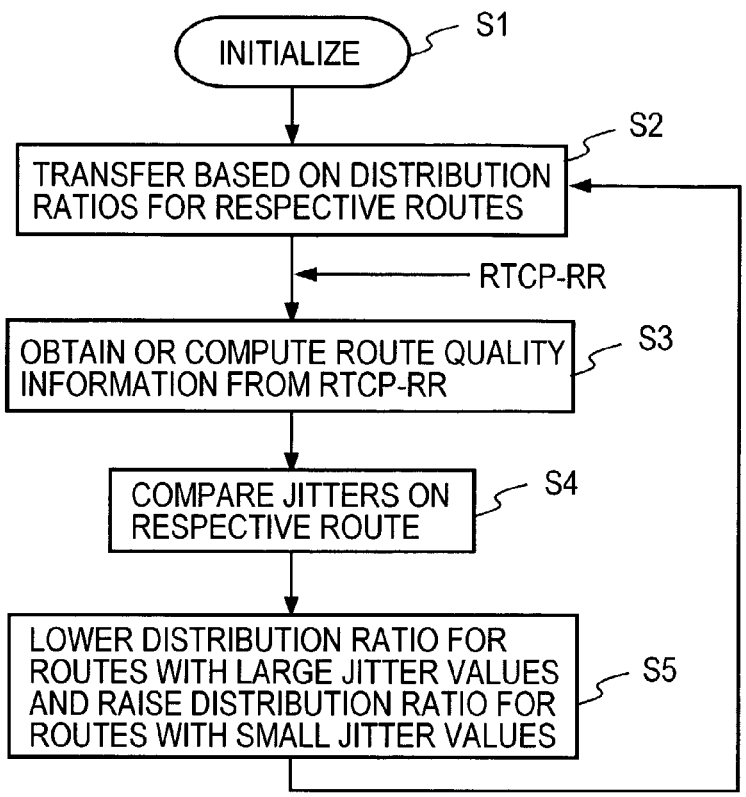
FIG. 11 is a flowchart depicting the procedure at the source node according to a first embodiment of the present invention.

FIG. 11 shows the procedure of the source node in the case of using jitter J as the route quality information.

Step S1: Set initial values of the distribution ratios for multiple routes as desired.

Step S2: Send packets over the multiple routes at the initialized distribution ratios.

Step S3: Obtain the jitter values J of the respective routes from received RTCP-RR.

Step S4: Compare the jitter values J of the respective routes.

Step S5: Increase the distribution ratios by a predetermined value for the routes of small jitter values J and decrease the distribution ratios by a predetermined value for the routes of large jitter values J, followed by a return to step S2.

While FIG. 11 shows the procedure to be followed in the case of using the jitter as the route quality information, it is also possible to use the packet loss rate which is obtained from the receiver report RTCP-RR, or the round-trip time RTT which is computed from LSR and DLSR available from RTCP-RR and the RTCP-RR receiving time $T_R$.

Figure 12:
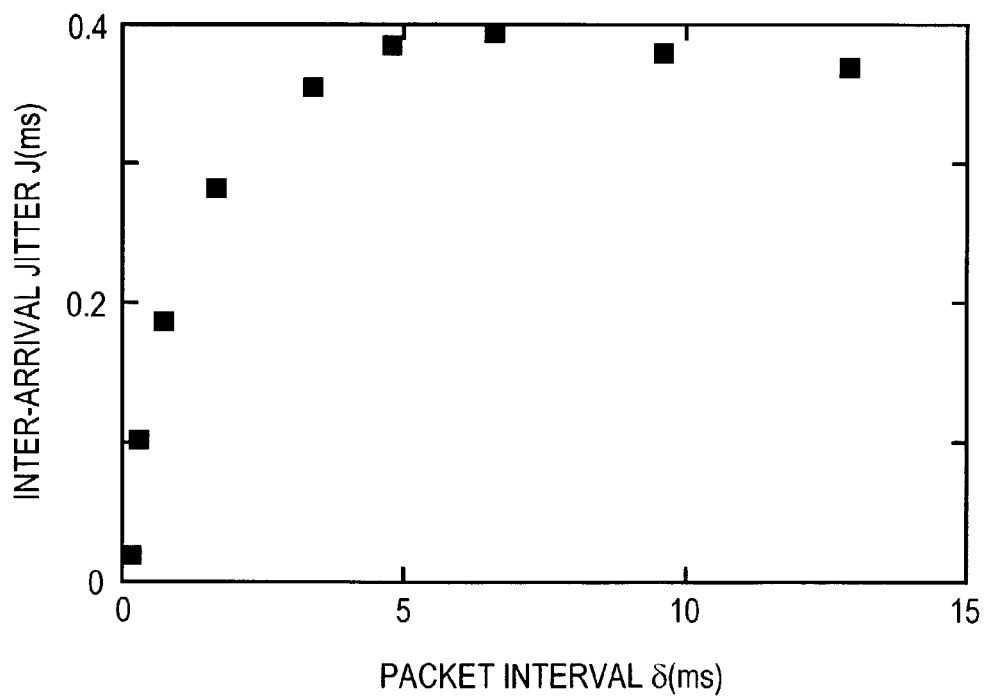
FIG. 12 is a graph showing the relationship between the packet interval and inter-arrival jitter.

Incidentally, there is a case where the distribution ratio for a certain route becomes extremely small as the adaptive changing of the distribution ratios for multiple routes is repeated in the first embodiment. In such a case, the routes provides packets at very long time intervals than the other routes. It was found by inventors' simulations, however, that as the packet interval δ increases, the packet inter-arrival jitter sharply increases irrespective of the actual traffic on the route as shown in FIG. 12. In order that the jitter value corresponding to the actual traffic may be measured at the destination, it is also possible to adjust at the source node in step S2 in FIG. 11 the timing or order of packet transmission in such a manner as to provide the packets to each route at equal time intervals.

To this end, two or more packets are provided in succession to each route at equal time intervals. That is, when two routes 31 and 32 are used as in the FIG. 1 example and the distribution ratio is 1:9, 10 packets are provided in succession to the route 31 at equal time intervals, and then 90 packets are provided in succession to the route 32 at equal time intervals. In this instance, the packet interval on the route 31 and the packet interval on the route 32 need not always be equal.

Embodiment 2

In this embodiment, at the destination node handles the packets received from multiple routes in step S21 in FIG. 10 without distinction of route, and computes the packet loss rate or packet inter-arrival jitter for all the received packets. That is, the destination node processes the received packets, regarding a set of multiple routes as a single virtual route. The route information thus obtained is inserted in RTCP-RR together with LSR and DLSR and sent to the source node in step S2.

The source node adaptively changes the distribution ratios for the multiple routes in step S14 on the basis of the route quality information obtained from the receiver report RTCP-RR in step S13. For example, the distribution ratio for an arbitrarily chosen route is increased by a predetermined value, and if the route quality information obtained from RTCP-RR received next indicates an improvement in the quality of the virtual route, the distribution ratio for that one route is further increased by a predetermined value, whereas if the route quality information indicates deterioration in quality, the distribution ratio for that route is lowered by a predetermined value and the distribution ratios for the other routes are each raised by a predetermined value. The distribution ratios for the respective routes can be adaptively changed by changing the distribution ratios and feeding back the resulting change in the quality information of the virtual route as described above. The quality information may be jitter, the packet return-trip time, or packet loss rate, for instance.

Embodiment 3

In the first and second embodiments the source node has been described to provide packets to the multiple routes in accordance with the distribution ratios at all times. In this embodiment, however, the source node: normally predetermines one of the multiple routes as a default route; sends packets over the default route alone (that is, sets the distribution ratios for the other routes to 0%); when the quality of the default route goes down below a predetermined value, raises the distribution ratios for other routes; and when the quality of the default route goes up above the predetermined value, sets the distribution ratio for the default route again to 100%.

Figure 13:
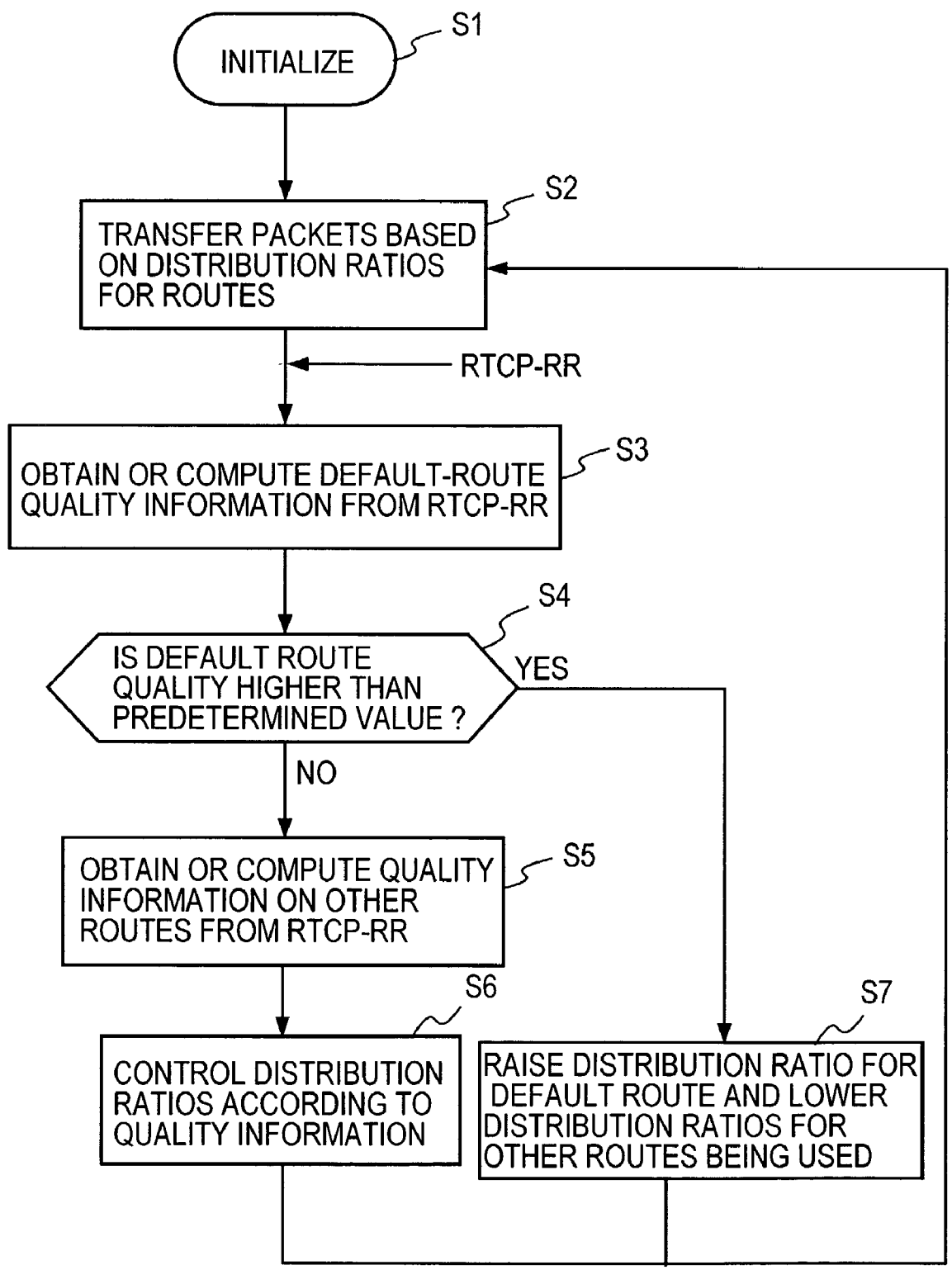
FIG. 13 is a flowchart showing the procedure at the source node according to a third embodiment of the present invention.

FIG. 13 shows the procedure of the source node in this embodiment.

Step S1: Predetermine the default route and set the distribution ratio therefor to 100%.

Step S2: Provide packets to the default route at the distribution ratio 100%.

Step S3: Obtain quality information on the default route from the receiver report RTCP-RR, or compute the packet round-trip time as the quality information from the RTCP-RR receiving time TR, LSR and DLSR.

Step S4: Compare the quality of the default route with a prescribed value.

Step S5: If the route quality is lower than the prescribed value, obtain quality information on the other routes from RTCP-RR.

Step S6: If the route quality of the other routes is higher than the prescribed value, lower the distribution ratio for the default route by a predetermined value, raise the distribution ratios for the other routes according to the route quality, and return to step S2. But when the distribution ratio for the default route is 100%, quality information on the other routes is not available, so that the distribution ratios for the other routes are equally raised.

Step S7: If the route quality is found higher than the prescribed value in step S2, raise the distribution ratio for the default route by a predetermined value, then lower the distribution ratios for the other routes by a predetermined value, and return to step S2. When the distribution ratio for the default route is already 100%, it is kept unchanged.

Embodiment 4

The third embodiment has been described to determine one default route as a route that is normally used, but in this embodiment an arbitrary one of multiple routes is selected for normal use, and when the quality of the selected route goes down below a permitted level, distribution ratios are assigned to other routes.

Figure 14:
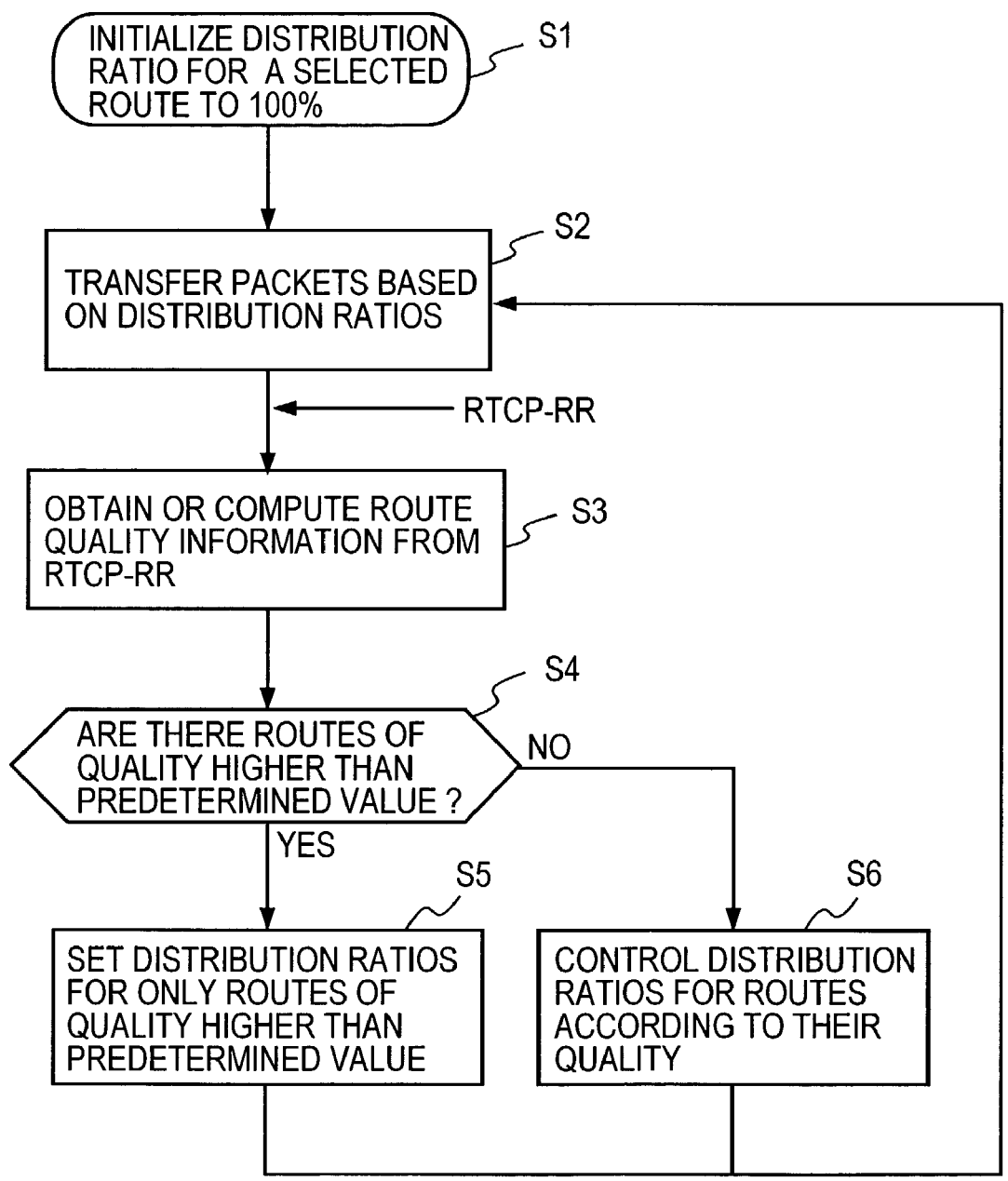
FIG. 14 is a flowchart showing the procedure at the source node according to a fourth embodiment of the present invention.

FIG. 14 depicts the procedure of the source node in this embodiment.

Step S1: Set a distribution ratio 100% as an initial value in an arbitrarily chosen route.

Step S2: Transfer packets over the chosen route according to the preset distribution ratio.

Step S3: Obtain or compute route quality information from the receiver report RTCP-RR.

Step S4: Decide whether there are routes with their quality higher than a prescribed value.

Step S5: When there are routes with their quality higher than the prescribed value, raise the distribution ratios for such routes by a predetermined value and return to step S2.

Step S6: If there are no routes with their quality higher than the prescribed value, control the distribution ratios for the routes according to their quality and return to step S2.

In the FIG. 14 embodiment, when it is decided in step S4 that the route quality has deteriorated below the prescribed value, part of traffic is distributed to other routes, then the quality of each route is compared with the quality of the other routes, and the distribution ratios for routes of better quality are gradually raised. When it can be decided that the quality of only either one of the routes satisfies the prescribed value, control can be effected to perform communications over the route alone.

Embodiment 5

By adaptively changing the distribution ratios for multiple routes at the source node as described above, the situation sometimes arises where a 100% distribution ratio is set in only in one route but 0% in the other routes. In such an instance, since packets are sent solely over that one route, the source node does not obtain quality information about other routes from the receiver report, and consequently, the quality information available in this case differs from that in the case of using multiple routes. By changing the distribution ratios for multiple routes in the manner described above, there could arise the state of single-route communication and the state of multi-route communication. This embodiment adopts a different distribution ratio control method for each of the single-route communication and the multi-route communication.

Figure 15:
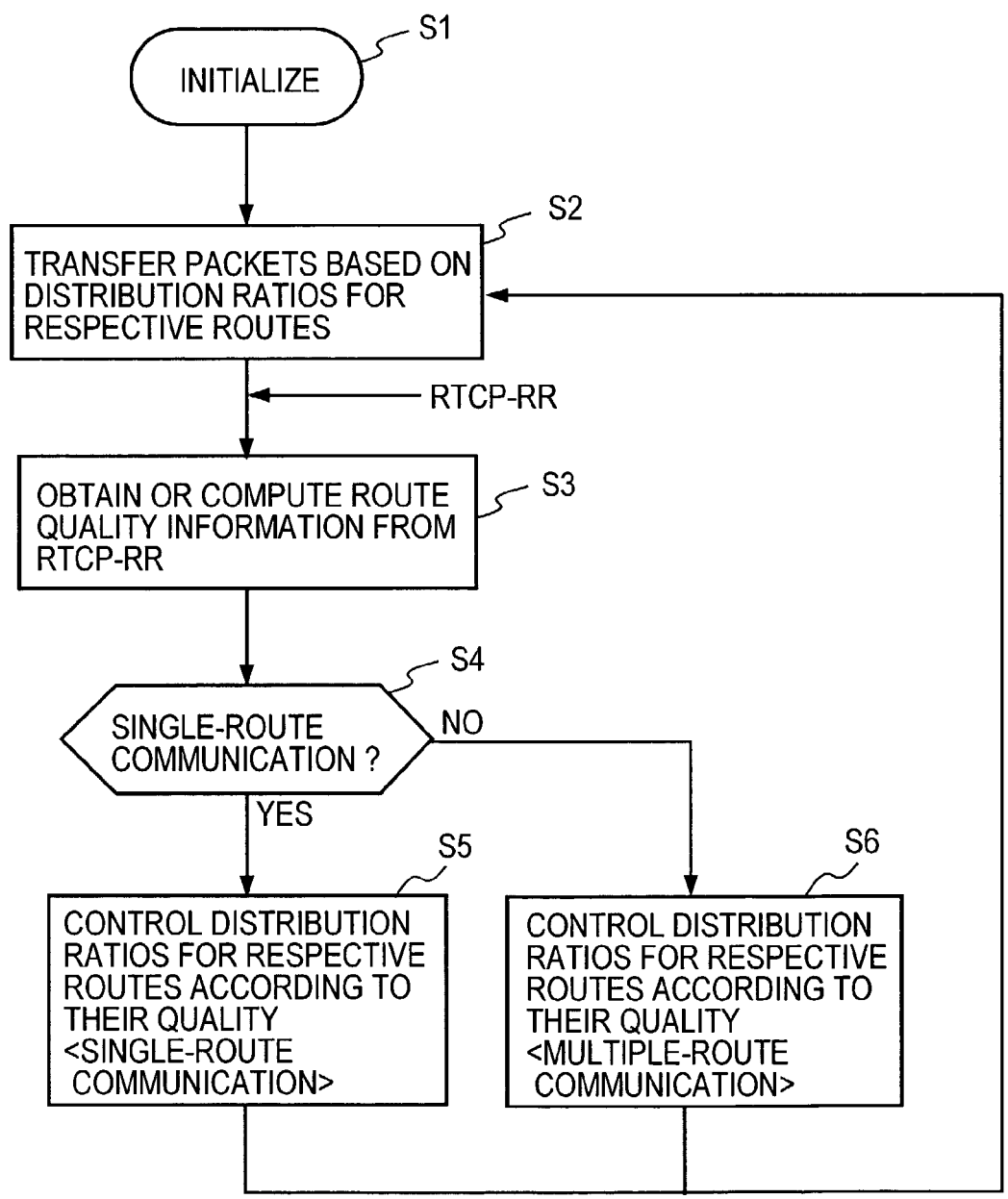
FIG. 15 is a flowchart showing the procedure at the source node according to a fifth embodiment of the present invention.

FIG. 15 shows the procedure of the source node in this embodiment.

Step S1: Set initial values of distribution ratios arbitrarily determined for multiple routes.

Step S2: Send PFT packets over the respective routes at the set distribution ratios.

Step S3: Obtain or compute quality information on each route from the receiver report RTC-RR.

Step S4: Decide whether the current state of communication is the single-route communication.

Step S5: In the case of single-route communication, the distribution ratios for the multiple routes are determined by a method predetermined for the single-route communication and return to step S2.

Step S6: In the case of multiple-route communication, the distribution ratios for the multiple routes are determined by a method predetermined for the multi-route communication and return to step S2.

Figure 16A:
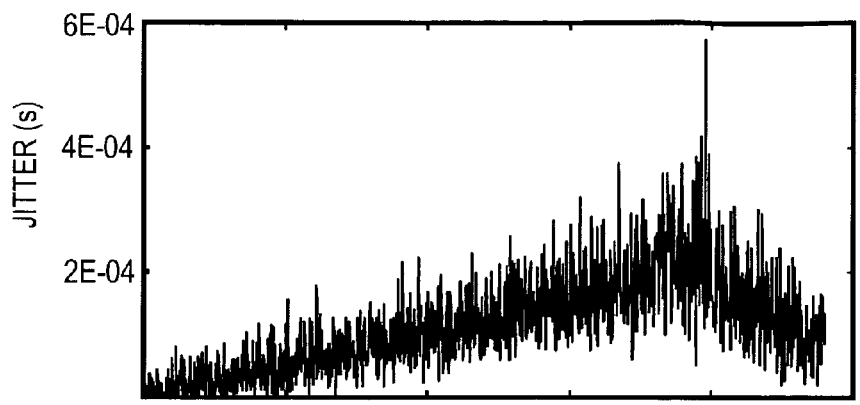
FIG. 16A is a graph showing the relationship between congestion and jitter.
Figure 16B:
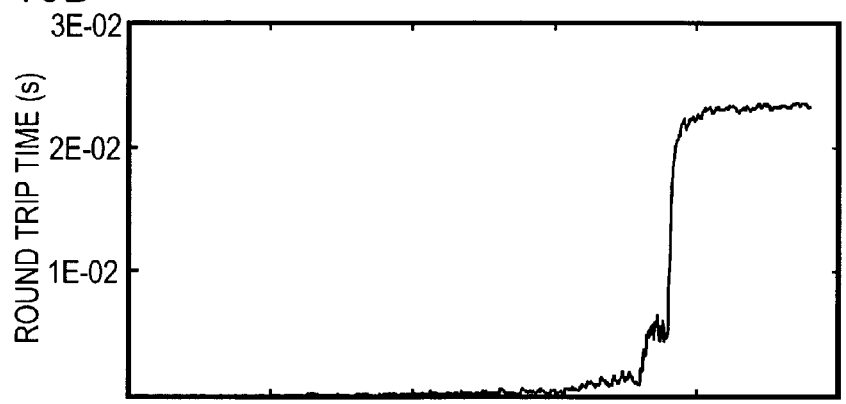
FIG. 16B is a graph showing the relationship between congestion and round-trip time.
Figure 16C:
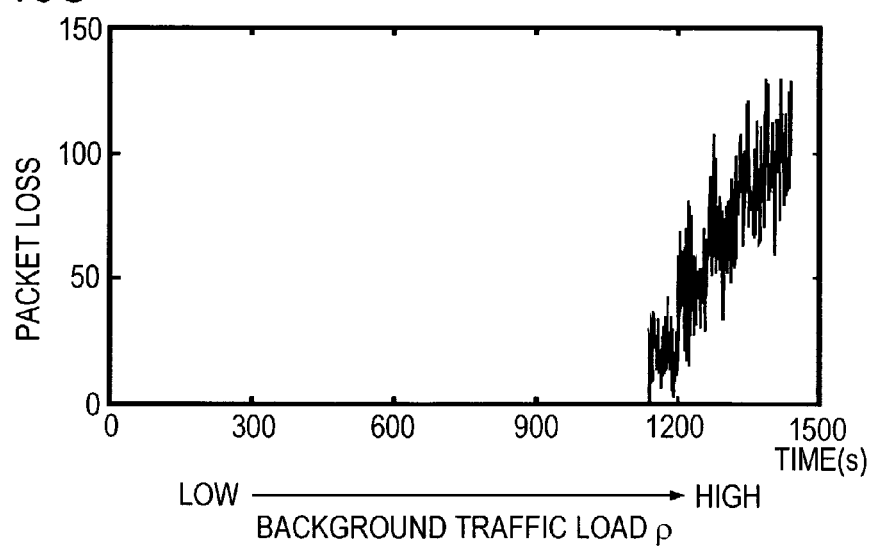
FIG. 16C is a graph showing the relationship between congestion and packet loss.

During the single-route communication, it is impossible to obtain route quality information for each route in step S3. It was found by the inventors' simulations that the packet round-trip time sharply increases immediately before congestion starts to occur in a certain route. FIGS. 16A, 16B and 16C shows the results of simulations about variations in jitter, packet round-trip time and packet loss when the traffic load ρ monotonously increases in one route with the lapse of time. As shown in FIG. 16C, an increase in the traffic load causes a sharp increase in the packet loss at and after a certain point in time, resulting in the occurrence of congestion. FIG. 16A shows that jitter gently varies in such a manner as to reach its peak at the time when congestion begins. In contrast thereto, FIG. 16B shows that the packet round-trip time sharply increases immediately prior to the start of congestion but thereafter it does not markedly varies.

For example, when the packet loss increases in the route currently used for communication, there is the possibility of persistent congestion occurring, in which case the source node effects control in step S5 to sharply lower the packet distribution ratio for this route but sharply raise the distribution ratios for other routes. Alternatively, even if the packet loss is smaller than a preset level, when the packet round-trip time RPP increases, for example, in the route currently used for communication, there is the possibility of the occurrence of congestion; hence, the packet distribution ratio for this route is lowered by a predetermined value and the distribution ratios for other routes are raised by a predetermined value.

During multiple-route communication the packet loss for each route can be obtained from RTCP-RR. Since there is the possibility of persistent congestion occurring, for example, in a route with a large packet loss, the source node effects control in step S6 to sharply decrease the packet distribution ratio for this route but sharply increase the distribution ratio for a route with a smaller packet loss on the basis of the packet loss rates of other routes. Similarly, during communication simultaneously using multiple routes jitter information for each route can be obtained from the RTP packet sent over each route. Since there is the possibility of temporary congestion occurring in a route with large jitter, the source node effects control in step S6 to lower the packet distribution ratio for that route to some extent but raise the distribution ratio for routes with small jitter on the basis of jitter in those routes.

In the case of sending packets over multiple routes, the reliability of measured values of jitter can be increased by adjusting the timing or order of sending the packet so that the packet intervals on the multiple routes are nearly equal.

Figure 17:
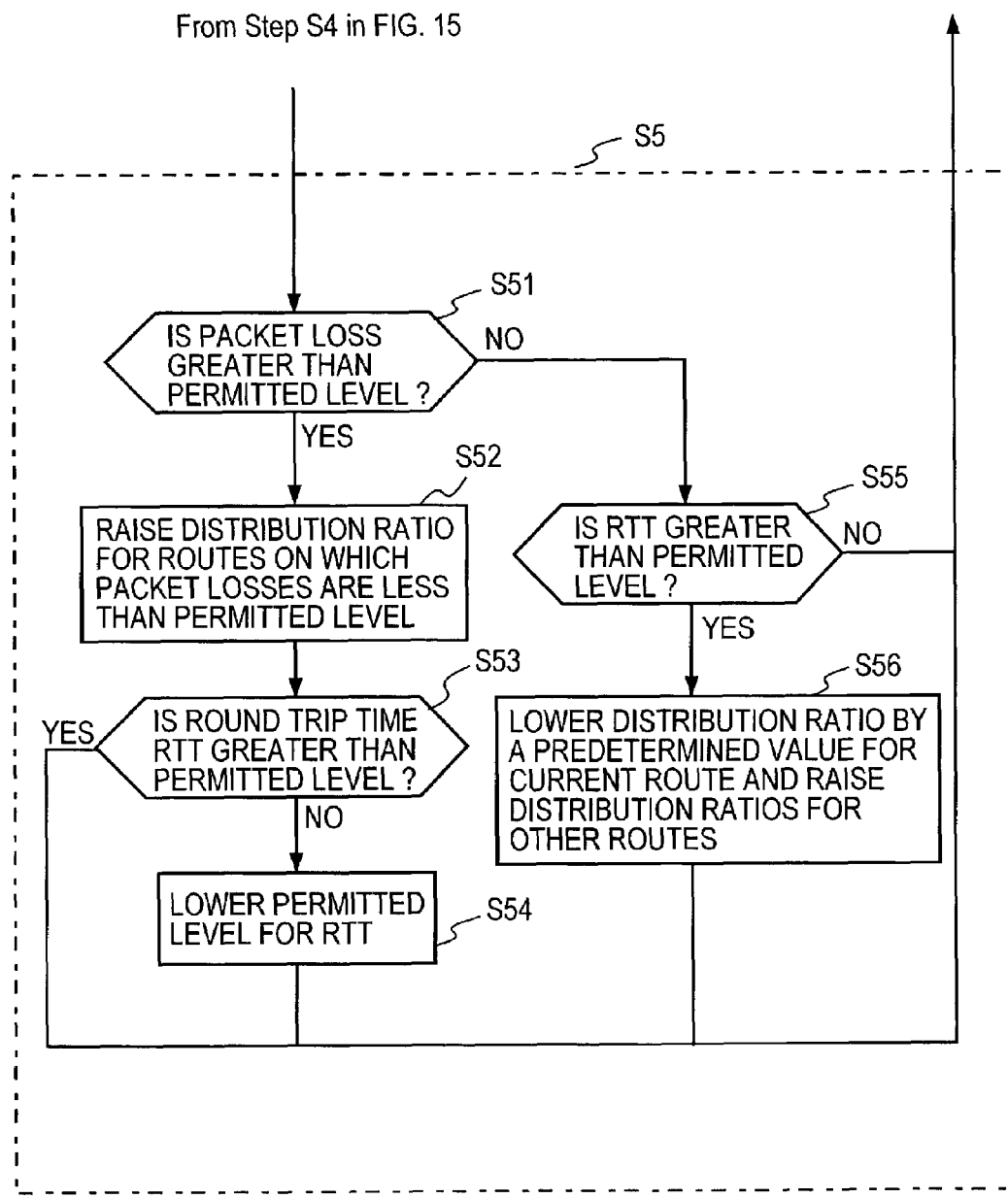
FIG. 17 is a flowchart depicting an embodiment of step S5 in FIG. 15.

FIG. 17 shows an example of the procedure in step S5 in FIG. 15.

During single-route communication the source node monitors packet loss and packet round-trip time as route quality information, and when the packet loss increases in excess of a preset level, the source node greatly lowers the distribution ratio for the route but equally raises the distribution ratios for other routes. When the packet round-trip time exceeds a preset level, the source node estimates that traffic concentration on the route causes congestion as mentioned previously with reference to FIGS. 16A, 16B and 16C, and lowers the distribution ratio for that route by a predetermined value from 100% and divides the lowered value of distribution ratio among other routes, for example, equally. An example of the procedure in step S5 in FIG. 15 will be described with reference to FIG. 17.

Step S51: Compare the packet loss rate in a single currently-used route with a preset level $PL_S$ and decide whether the loss rate is higher than $PL_S$.

Step S52: If the packet loss rate is above $PL_S$, increase the distribution ratios as predetermined for the routes with their packet loss rate lower than $PL_S$.

Step S53: Make a check to see if the packet round-trip time RTT is above a preset level $RTT_S$, and if so, return to step S5 in FIG. 15.

Step S54: If the packet round-trip time RTT is not above $RTT_S$, lower the level $RTT_S$ by a predetermined value $\delta RTT_S$ and return to step S2.

Step S55: If the packet loss rate is not above the preset level $PL_S$ in step S51, decide whether the packet return-trip time RTT is above the preset level $RTT_S$, and if not return to step S2.

Step S56: If the packet return-trip time RTT is above $RTT_S$, since the occurrence of congestion is predicted in that route as referred to previously, lower the distribution ratio for the current route by a predetermined value and increase the distribution ratios by a predetermined value for the other routes and return to step S2.

As described above, according to the fifth embodiment, it is possible to determine the distribution ratios on the basis of a different piece of route quality information for each of the multi-route packet transmission and the single-route packet transmission.

In the procedure of FIG. 16, jitter may be used in place of the packet loss rate. Since there is the possibility of temporary congestion occurring in a route with a large jitter value, the source node lower the data distribution ratio for that route by a predetermined value and raise the distribution ratios for routes with low jitter by a predetermined value.

Embodiment 6

While in the above it has been described that the packet round-trip time RTT can be used as one piece of the route quality information, the round-trip time RTT is affected by the condition of the route from the source to the destination node, and hence it is not apt as a measure of the receiving condition of the destination node. The packet one-way tip time is rather effective as a more accurate indication of the route quality information.

This embodiment utilizes the one-way trip time as the route quality information. For accurate measurement of the one-way trip time, however, it is necessary that clocks of the source node and the destination node be synchronized with each other. This embodiment utilizes GPS (Geographical Positioning System) to establish synchronization between the clocks of the both nodes in the measurement of the one-way trip time.

Figure 18:
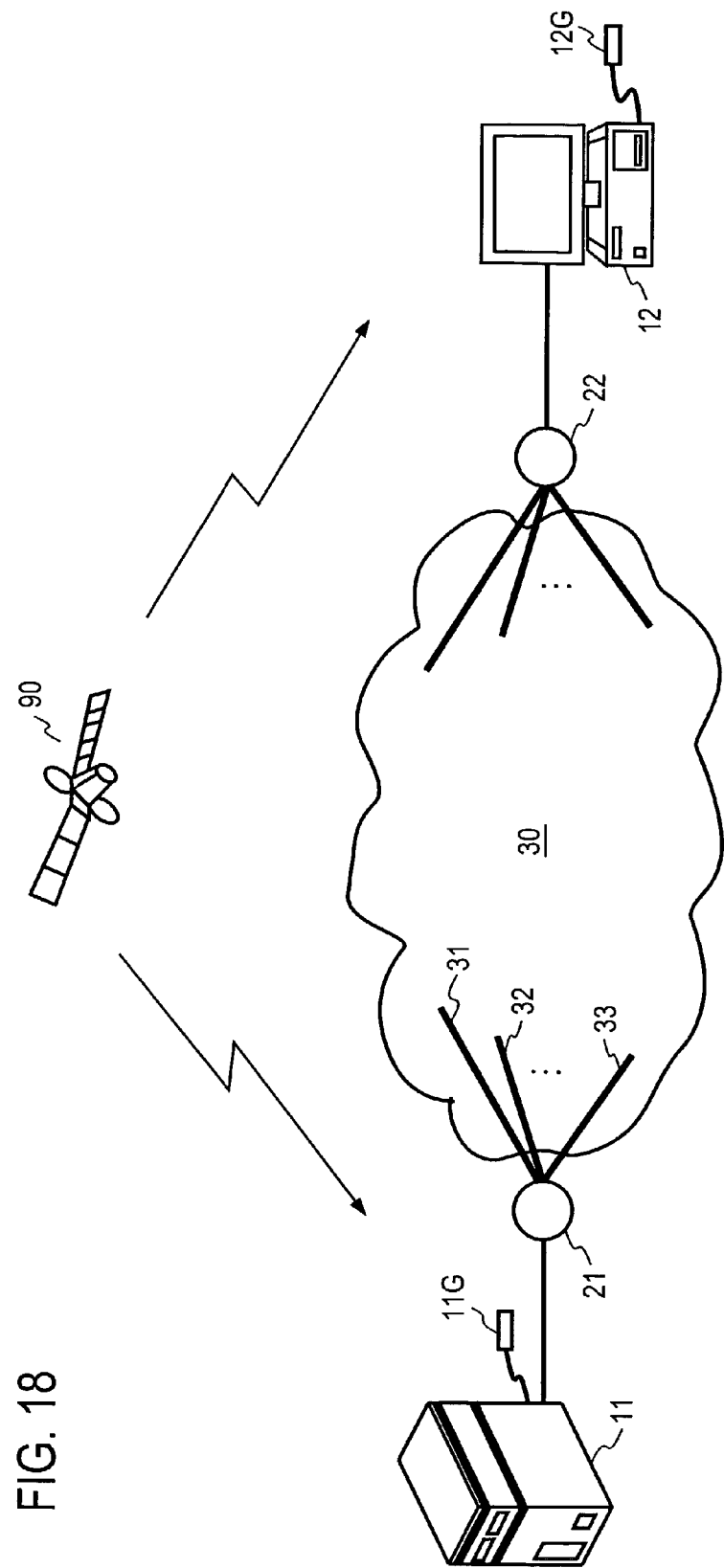
FIG. 18 is a diagrammatic showing of the network architecture according to a sixth embodiment of the present invention.

FIG. 18 illustrates the network configuration according to this embodiment, the parts corresponding to those in FIG. 1 being identified by the same reference numerals. The illustrated network configuration features GPS receivers 81 and 82 placed in the nodes 11 and 12, which receive a GPS signal from a satellite 90 to synchronize clocks of the nodes (clocks in computers) with the time indicated by the same GPS signal.

The one-way trip time TT for sue in this embodiment is computed by TT=Rn−TS from the timestamp (TS) 62 written by the source node in the RTP header (FIG. 3) of the RTP packet to be sent over each route and the time Rn at which the destination node received the RTP packet from each route. The destination node sends the one-way trip time TT thus obtained to the source node after writing it in an appropriate filed of RTCP-RR. The source node uses, as the quality information in each of the afore-described embodiments, the one-way-trip time TT over each route obtained from the receiver report RTCP-RR. For example, ratio of reciprocals of the one-way trip times TT for the multiple routes can be set as distribution ratio in each route.

Not only the one-way trip time but also jitter or packet loss rate can be used as the route quality information. By setting the distribution ratios for respective routes in correspondence to the route quality information as described above, it is possible to maximize the transmission rate from the source node to the destination node.

In the measurement of the one-way trip time at the destination node, the time, Ci, of reception of RTCP-SR over each route can be used. In such an instance, the one-way trip time TT can be computed from the RTCP-SR receiving time Ci and the timestamp in RTCP-SR.

Procedure of the Destination Node

Figure 19A:
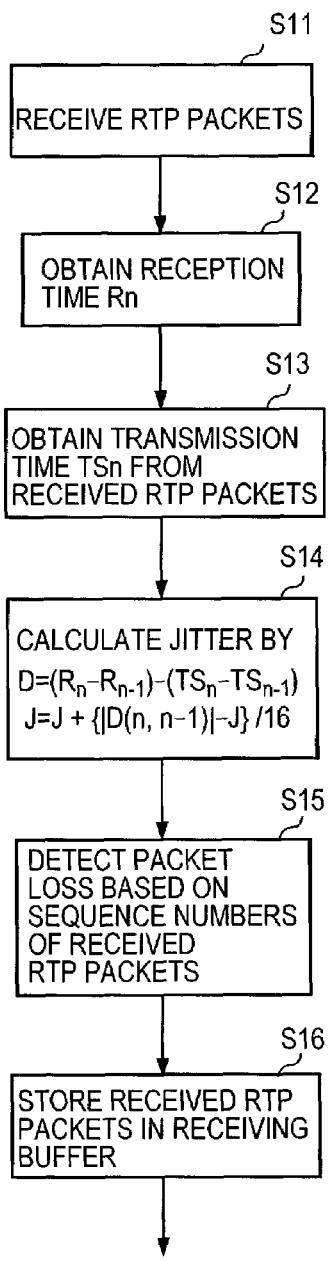
FIG. 19A is a flowchart showing the procedure by which the source node obtains route quality information in each embodiment of the present invention.
Figure 19B:
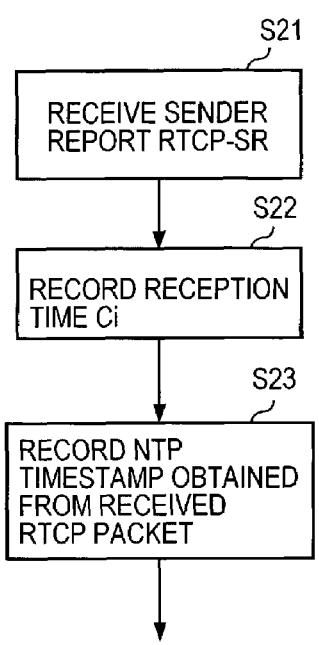
FIG. 19B is a flowchart showing the procedure by which the destination node obtains information from the sender report.
Figure 19C:
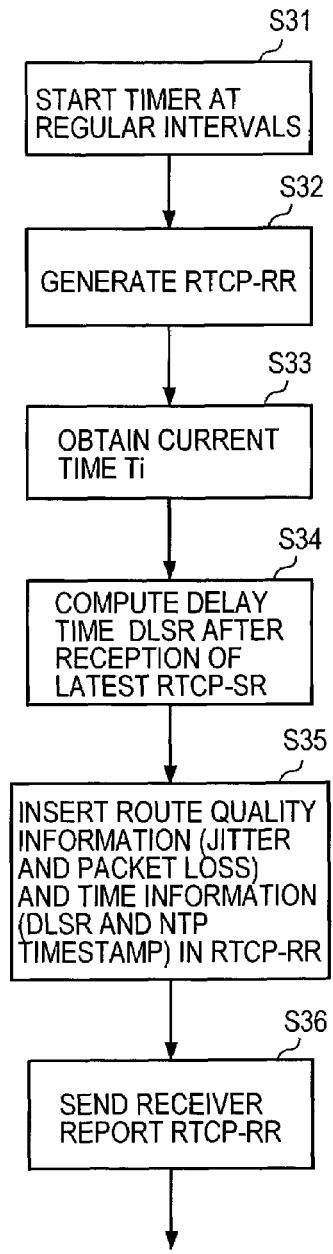
FIG. 19C is a flowchart showing the procedure by which the destination node generates the sender report.

FIGS. 19A, 19B and 19C show procedures which the destination node follows in each of the above-described embodiments.

FIG. 19A depicts the procedure for obtaining quality information on each route.

Step S11: Receive RTP packets from respective routes.

Step S12: Obtain each RTP packet receiving time Rn.

Step S13: Obtain from the received RTP packets the timestamps TS (FIG. 3) indicating the time of their transmission.

Step S14 Calculate the packet inter-arrival jitter J by Eqs. (1) and (2) for each route.

Step S15: Detect packet losses based on the sequence numbers SN of the received RTP packets and compute the packet loss rate for each route.

Step S16: Store the received RTP packets in a receiving buffer.

The data in the payload part is extracted by the application from the received RTP packets and used.

FIG. 19B depicts the sender report RTCP-SR receiving procedure.

Step S21: Receive the sender report RTCP-SR (FIG. 5).

Step S22: Store the RTCP-SR receiving time Ci.

Step S23: Obtain the NTP timestamp from RTCP-SR and record it.

FIG. 19C depicts the receiver report generating procedure.

Step S31: Start a timer which provides timing at time intervals $\delta T$.

Step S32: Generate a packet for the receiver report RTCP-RR.

Step S33: compute the elapsed time DLSR=Ti−Ci from the time the last sender report RTCP-SR was received (steps S22 and S23 in FIG. 19B) and the current time Ti.

Step S35: Insert in RTCP-RR the jitter J and packet loss rate obtained in steps S14 and S15 in FIG. 19A, the elapsed time DLSR and the NTP time stamp in RTCP-SR.

Step S36: Send the receiver report RTCP-RR.

The data transmission control method according to each of the above-described embodiments may preferably be implemented under computer control. As referred to previously, a program for implementing the data transmission control method under computer control also falls inside the scope of the present invention.

Figure 20:
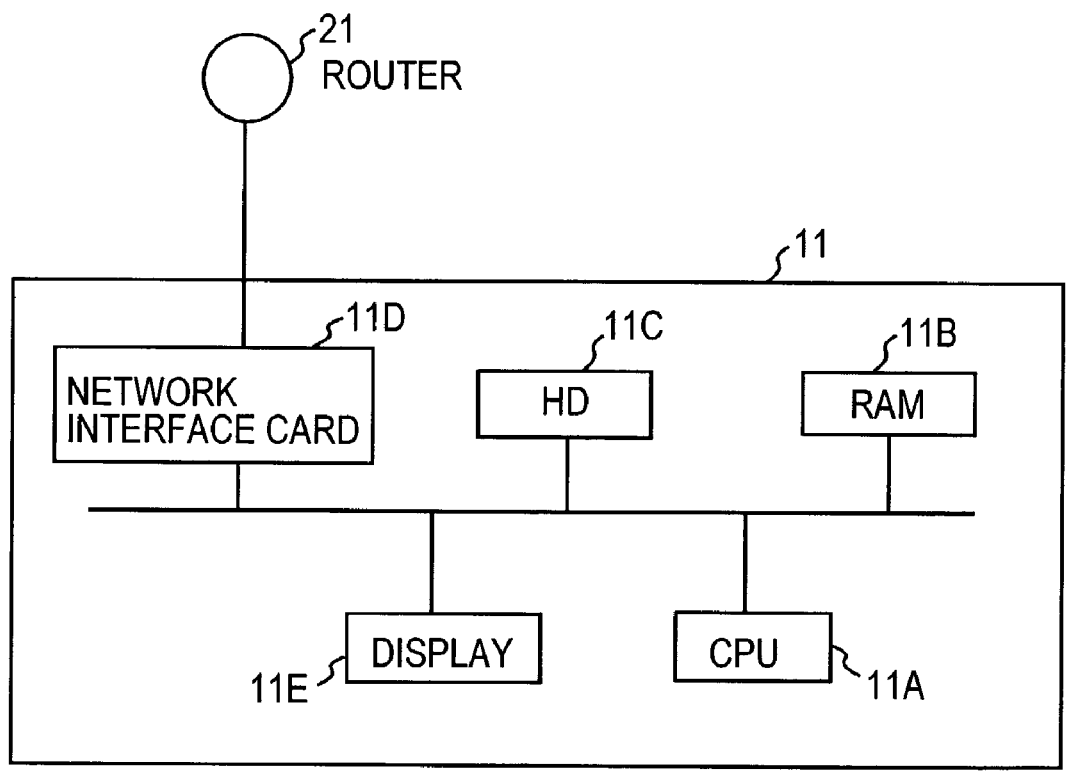
FIG. 20 is a block diagram illustrating a data transmission unit which constitutes the source node according to the present invention.

As will be seen from the description given of each embodiment, a data transmission unit serving as the source node which implements the data transmission control method of the invention is provided with quality information obtaining means for obtaining route quality information from the destination node, and distribution control means for adaptively changing the data distribution ratios for multiple routes on the basis of the quality information. FIG. 20 illustrates an example of the construction of the data transmission unit, which is basically similar to common computers. The data transmission unit comprises CPU (Central Processing Unit) 11A, a RAM (Random Access Memory) 11B, a hard disk 11C as a large-capacity storage, a display 11E, and a network interface card 11D connected to the edge router 21. The program having described therein the aforementioned data transmission control procedure of the present invention, which the source node executes, is stored in the hard disk 11D, for instance. At the time of communication the program is read out of the hard disk 11D and into the RAM 11B for execution by the CPU 11A, Accordingly, the quality information obtaining means and distribution control means in the transmission unit of the present invention are implemented by the execution of the program.

The above-described embodiments are merely illustrative of the present invention and are not intended to be limiting the invention. Needless to say, appropriate modifications and variations may be effected without departing from the scope of the spirits of the present invention.

EFFECT OF THE INVENTION

As described above in detail, according to the present invention, multiple routes are set up between two points of data transmission and reception in a best-effort-service-type internet, and by quickly changing data distribution ratios for the multiple routes in response to ever-lasting route conditions, it is possible to avoid data loss or delay due to network faults or traffic congestion and hence provide increased throughput.

What is claimed is:

1. A data transmission control method for sending transmitting data from a source node to a destination node on a network, said method comprising the steps in the source node of:

(a) putting data into packets, assigning sequence numbers to said packets and sending said packets to said destination node over multiple routes;

(b) obtaining from said destination node quality information on multiple routes between said source node and said destination node in response to the packets transmitted to said destination node from the source node; and (c) adaptively changing packet distribution ratios for said multiple routes based on said quality information on said multiple routes.

2. The method of claim 1, wherein said step (b) includes a step of obtaining said quality information on each of said multiple routes, and said step (c) includes a step of changing said packet distribution ratios based on said quality information and sending said packets over said multiple routes at said packet distribution ratios.

3. The method of claim 2, wherein said step (c) includes a step of raising the packet distribution ratios for routes of high quality and lowering the packet distribution ratios for routes of low quality.

4. The method of claim 3, wherein said step (b) includes a step of obtaining, as said quality information, jitter on each route from said destination nodes, and said step (c) includes a step of comparing said multiple routes in terms of said jitter, raising the packet distribution ratios for routes of said multiple routes having small jitter values and lowering the packet distribution ratios for routes of said multiple routes having large jitter values.

5. The method of claim 2, wherein said step (c) includes a step of changing the packet distribution ratio for each route based on said quality information.

6. The method of claim 5, wherein said step (b) includes a step of obtaining, as said quality information on said each route, a one-way trip time over said each route from said destination node, and said step (c) includes a step of determining said packet distribution ratio in inverse proportion to said one-way-trip time for said each route.

7. The method of claim 1, wherein said step (b) includes a step of obtaining said quality information on said multiple routes in their entirety as a single virtual route, and said step (c) includes a step of changing said packet distribution ratios based on said quality information obtained on said multiple routes in their entirety as a single virtual route.

8. The method of claim 7, wherein said step (c) includes a step of further changing said packet distribution ratios in the same direction as in the previous session of changing said packet distribution ratios when the network state has been improved by the previous packet distribution ratio changing session, and changing said packet distribution ratios in a direction opposite to that in said previous packet distribution ratio changing session when the network state has been degraded by said previous packet distribution ratio changing session.

9. The method of claim 1, wherein said step (c) comprises the steps of:

normally sending packets over a predetermined default route alone;

when the quality of said default route is degraded in excess of a permitted level, increasing the packet distribution ratios for the other routes and sending packets over said multiple routes; and sending packets over said default routes alone when the quality of said default route is recovered.

10. The method of claim 1, wherein said step (c) includes steps of:

normally sending packets over arbitrarily selected one of routes alone;

when the quality of said selected one route is degraded in excess of a permitted level, increasing the packet distribution ratios for the other routes and sending packets over said multiple routes including the other routes; and when the quality of any one of the routes is recovered, sending packets over said arbitrarily selected one of the routes alone.

11. The method of claim 10, wherein said step (b) includes a step of obtaining, as said quality information, a round-trip-time and the packet loss rate on each of said routes from said destination node, and said step (c) includes a step of deciding whether the packet loss rate on said each route is higher than a predetermined level, and if so, changing the packet distribution ratio for said each route by a predetermined scheme according to said route quality information.

12. The method of claim 10, wherein said step (b) includes a step of obtaining, as said quality information, a round-trip-time and jitter on each of said routes from said destination node, and said step (c) includes a step of deciding whether said jitter on said each route is higher than a predetermined level, and if so, changing the packet distribution ratio for said each route by a predetermined scheme according to said route quality information.

13. The method of claim 1, wherein said step (c) includes a step of deciding whether the communication between said source node and said destination node is established over only one route or multiple routes, and adaptively changing a scheme for determining packet distribution ratio according to a result of the decision.

14. The method of claim 1, wherein said step (b) includes a step of sending two or more packets successively over said multiple routes at about the same intervals.

15. The method of any one of claims 1 and 2 to 14, wherein said data is real-time data.

16. A computer readable recording medium embedded with a program to cause a computer to perform said method of any one of claims 1 and 2 to 14.

17. A transmission unit of a source node which sets up multiple routes from the source node to a destination node on a network and sending data from said source node to said destination node, said source node comprising:
 means for putting data into packets and assigning sequence numbers to said packets;
 means for sending said packets to said destination node over said multiple routes;
 means for obtaining quality information on said routes from said destination node in response to the packets transmitted to said destination node from said source node; and
 distribution control means for adaptively changing packet distribution ratios for said multiple routes based on said quality information obtained by said means for obtaining quality information.

18. The transmission unit of claim 17, wherein said distribution control means raises the packet distribution ratios for high-quality routes and lowers the packet distribution ratios for low-quality routes on the basis of said quality information obtained by said means for obtaining quality information for said multiple routes.

19. The transmission unit of claim 17, wherein said means for obtaining quality information obtains, as said quality information, a round-trip time on each of said multiple routes or a one-way-trip time from said source node to said destination node, and said distribution control means distributes said packets to said multiple routes, using the packet distribution ratios in inverse proportion to said transmission times over said multiple routes.

20. The transmission unit of claim 17, wherein said quality information shows the quality of said multiple routes in its entirety as a single virtual route and said distribution control means adaptively changes the packet distribution ratios for each of said multiple routes based on said quality information obtained on said multiple routes in their entirety as a single virtual route.

21. The transmission unit of claim 20, wherein
 when the current quality information indicates that the previous session of changing the packet distribution ratios for said multiple routes improved the quality of said multiple routes in their entirety, the distribution control means further raises the packet distribution ratios for routes of said multiple routes for which the packet distribution ratios were raised in said previous session, and further lowers the packet distribution ratios for routes of said multiple routes for which the packet distribution ratios were lowered in said previous session; and
 when the current quality information indicates that the previous session of changing the packet distribution ratios for said multiple routes degraded the quality of said multiple routes in their entirety, the distribution control means further lowers the packet distribution ratios for routes of said multiple routes for which the packet distribution ratios were raised in said previous session, and further raises the packet distribution ratios for routes of said multiple routes for which the packet distribution ratios were lowered in said previous session.

* * * * *